Figure 1:
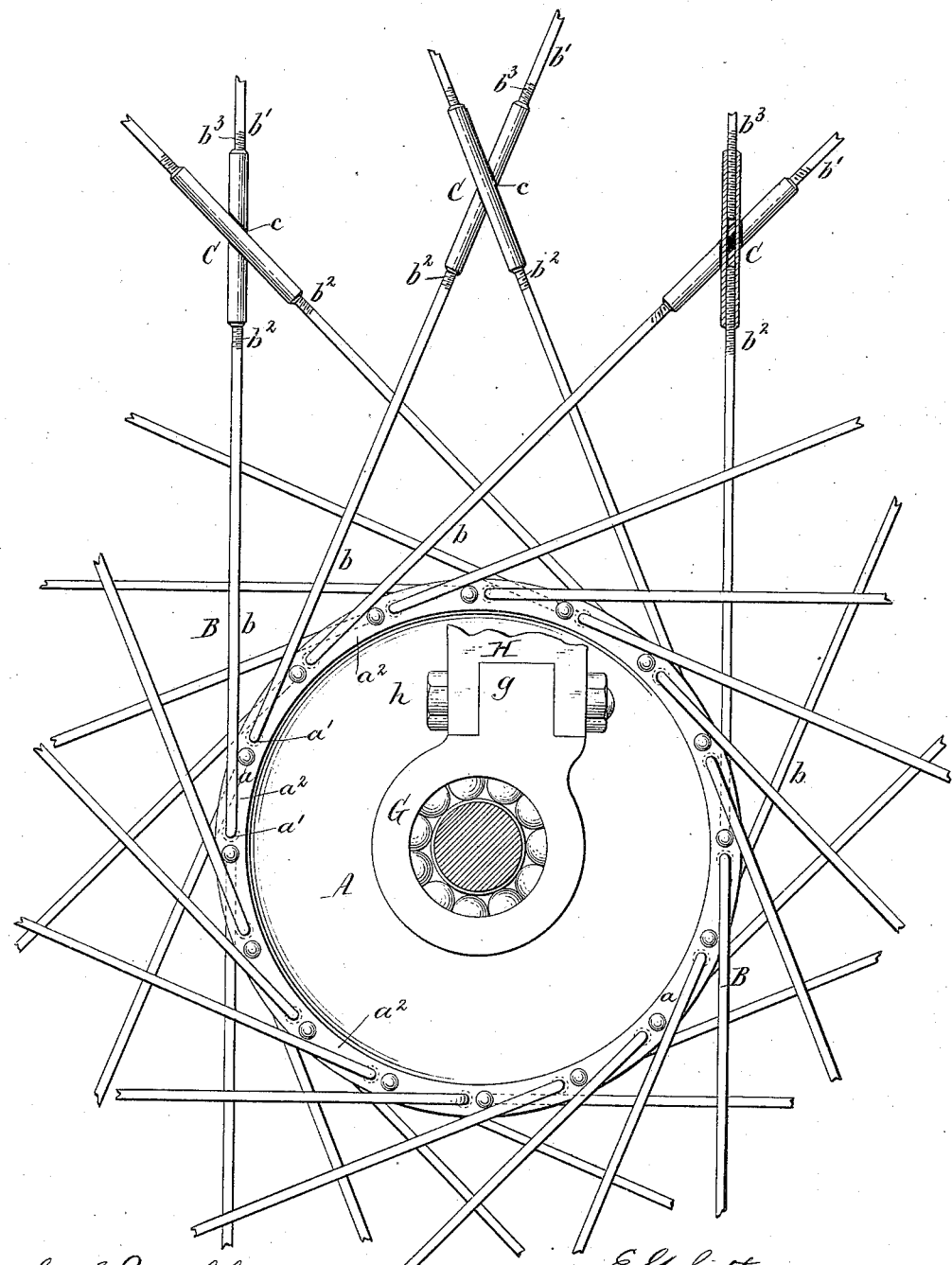

(No Model.)  2 Sheets—Sheet 1.

E. G. LATTA.
VELOCIPEDE.

No. 343,959. Patented June 15, 1886.

(No Model.) 2 Sheets—Sheet 2.
E. G. LATTA.
VELOCIPEDE.
No. 343,959. Patented June 15, 1886.
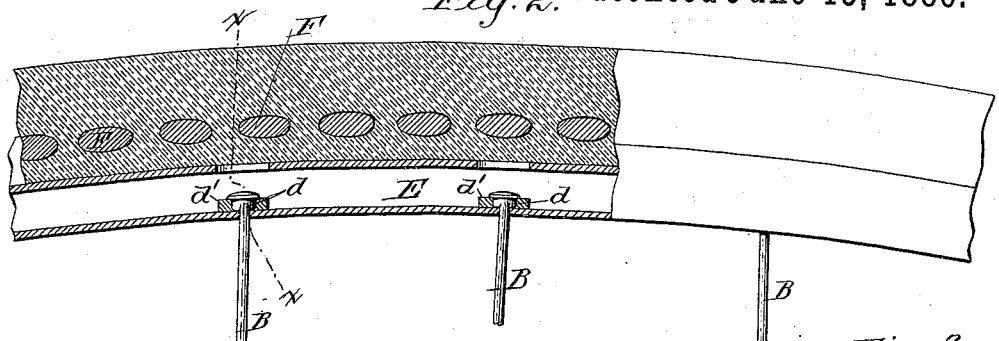
Fig. 2.
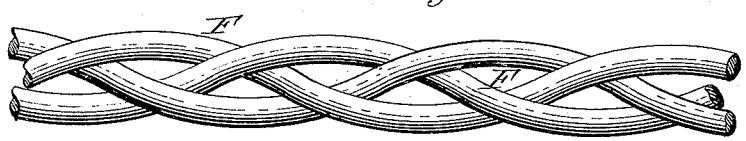
Fig. 4.
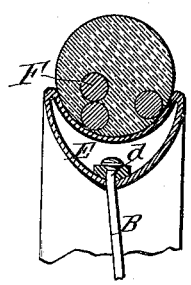
Fig. 3.
Fig. 5.
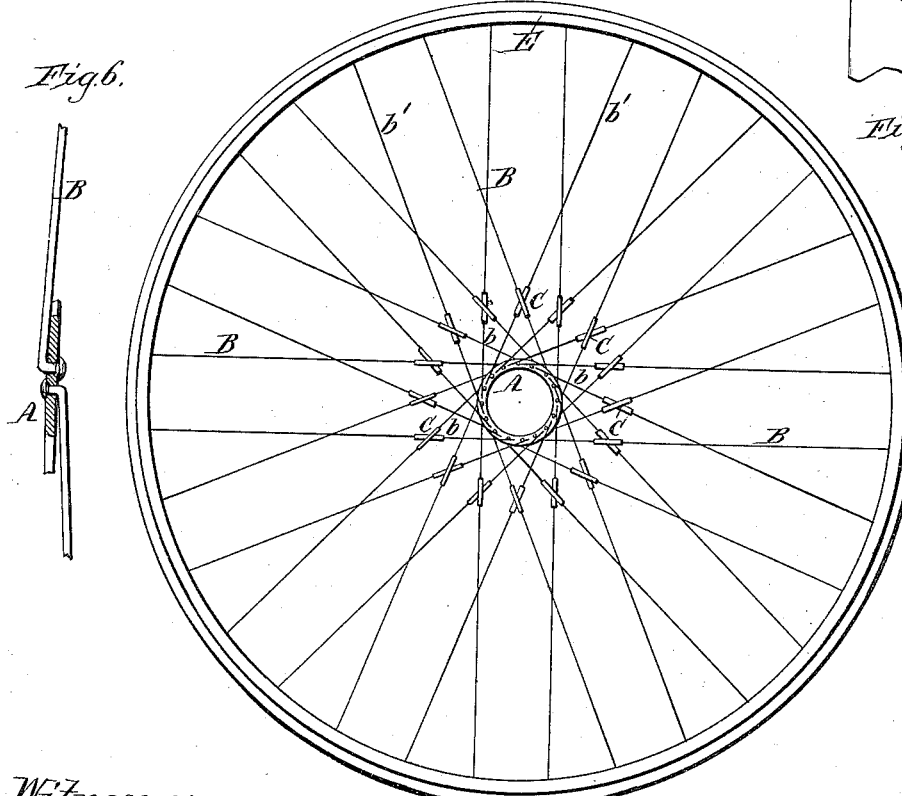
Fig. 6.
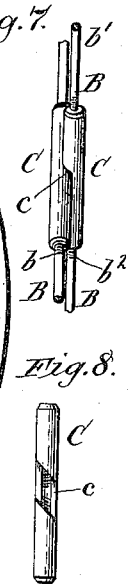
Fig. 7.
Fig. 8.
Fig. 9.
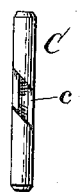
Witnesses:
Chas. J. Buchheit
Theodore L. Popp
E. G. Latta Inventor.
By Wilhelm Bonner
Attorneys

UNITED STATES PATENT OFFICE.

EMMIT G. LATTA, OF FRIENDSHIP, NEW YORK, ASSIGNOR OF ONE-THIRD TO ADRIAN C. LATTA, OF SAME PLACE.

VELOCIPEDE.

SPECIFICATION forming part of Letters Patent No. 343,959, dated June 15, 1886.

Application filed December 22, 1885. Serial No. 186,476. (No model.)

*To all whom it may concern:*

Be it known that I, EMMIT G. LATTA, of Friendship, in the county of Allegany and State of New York, have invented new and useful Improvements in Velocipedes, of which the following is a specification.

The object of this invention is to produce a light rigid wheel having tangent spokes which are prevented from working loose, while they can be easily tightened when necessary or be replaced when broken, and in which the different spokes will not interfere with each other; also to reduce the cost of the rubber tire and increase its strength and elasticity, and also to secure the wheel to the fork or frame in such manner that the position of the fork with reference to the wheel can be changed forwardly or backwardly in a simple and inexpensive manner, thereby affording means for producing greater safety or greater power, as may be desired.

In the accompanying drawings, consisting of two sheets, Figure 1 is a side elevation of the central portion of the wheel. Fig. 2 is a fragmentary longitudinal sectional elevation of a portion of the rim and tire. Fig. 3 is a cross-section in line $xx$, Fig. 2. Fig. 4 represents a fragmentary view of the braid which is molded into the tire. Fig. 5 is a side elevation of the wheel. Fig. 6 is a sectional elevation of a part of the hub-flange. Fig. 7 is an elevation of two of the interlocking coupling-sleeves. Fig. 8 is an elevation of one of the coupling-sleeves at right angles to Fig. 7. Fig. 9 represents one of the elongated heads and washers at the outer ends of the spokes.

Like letters of reference refer to like parts in the several figures.

A represents one of the hub-flanges, provided with a marginal rim, $a$, to which the tangent spokes B are secured.

The hub-flanges are constructed of the usual form, and the spokes are secured thereto, as in the form of wheels known as "Pauseys," by heading the spokes at the hub, and passing them through the flange alternately from the inside and outside and bending them against the hub-flange.

In order to permit the spokes to pass from the hub-flange to the rim of the wheel in tangent lines, or substantially so, without passing over the heads of adjacent spokes or interfering with adjacent spokes, the openings $a'$, through which the spokes are drawn in the marginal rim $a$ of the hub-flange, are arranged in pairs closely together, as represented in Fig. 1, with long smooth intervening spaces between every two pairs of openings, $a'$. The spokes rest against the hub-flange in these smooth intervening spaces between the several pairs of openings, $a'$, and these intervening spaces permit the spokes to pass from the hub-flange to the rim in tangent lines, or substantially so, without passing over the heads of adjacent spokes or otherwise interfering with the same. The spokes may be secured to the hub-flange in these intervening spaces, $a^2$, by soldering, if desired. The two spokes which pass through each pair of openings $a'$ extend in opposite directions from the hub-flange to the rim of the wheel and bear against opposite sides of the hub-flange, one being on the inner and one on the outer side thereof. This construction of the spokes and hub-flanges protects the spokes against injury by vibration and wear against the heads of neighboring spokes, and also permits a broken spoke to be replaced without disturbing any other spoke.

Each spoke B is composed of three separate parts—the inner part, $b$, which is attached to the hub-flange, the outer part, $b'$, which is attached to the rim of the wheel, and a coupling-sleeve, C, whereby the parts $b\ b'$ are secured together. The inner part, $b$, is headed at the hub end and screw-threaded at its outer end, as shown at $b^2$. The outer part, $b'$, is headed at the rim of the wheel and screw-threaded at its inner end, as shown at $b^3$.

The coupling-sleeve C is composed of a short piece of tubing provided with an internal screw-thread, which engages with the screw-threaded ends $b^2\ b^3$ of the wire parts of the spoke, and whereby both parts of each spoke are secured together.

The coupling-sleeves C are preferably each constructed with a right and left thread engaging with corresponding right and left threads formed, respectively, on the inner and outer parts, $b^2\ b^3$, of each spoke, so that the two parts of the spoke are drawn toward each other by turning the coupling-sleeve in the proper direction.

*d* represents the heads formed at the outer ends of the spokes and seated in the rim E in such manner that the spoke is prevented from turning in the rim.

$d'$ is an elongated washer, preferably interposed between the elongated head *d* of the spoke and the rim, as represented in Figs. 2 and 3. The inner portions of the spokes are of course prevented from turning by being passed through the openings $a'$ in the hub-flange.

The coupling-sleeves C are arranged at the points where the spokes cross each other, and are flattened or recessed on their adjacent sides, as shown at *c*, so that when the spokes are tightened the two coupling-sleeves C of two intersecting spokes will interlock with each other by means of their flattened or recessed adjacent sides, as represented in Figs. 1, 5, and 7, and thereby prevent the coupling-sleeves from unscrewing and the spokes from becoming loose.

In order to secure the spokes in the wheel, their inner portions are passed through the openings $a'$ of the hub and their outer portions through the openings in the rim E. The couplings C are then applied, so as to connect the two parts of each spoke together, and are turned so as to draw the two parts of each spoke toward each other until the proper tension is obtained. One of each pair of coupling-sleeves C is preferably left with its round side next the other coupling-sleeve, in order to prevent both sleeves from interlocking until both spokes have received about the proper tension. When both intersecting spokes have about the proper tension, the coupling-sleeves are turned to bring their flat or recessed sides together, when the tension of the spokes will cause the coupling-sleeves to interlock with each other. If the recessed or flat sides of the coupling-sleeves should not register when the spokes have the proper tension, one of the sleeves is moved up or down on the spoke until the proper position for interlocking is reached; or, when the difference is slight, one of the spokes may be sprung or stretched until the sleeves interlock.

In order to tighten a spoke that may have become loose by excessive strain, the coupling-sleeves are sprung apart, when either one may be turned with a spoke-grip or pliers. The spokes are passed under and over, as represented in Fig. 1, in order to cause the tension of the wire to hold the coupling-sleeves in close contact, and, if desired, the coupling-sleeves may be soldered together after the spokes are tightened, in order to prevent noise in passing over rough roads.

When a simpler and less expensive construction is desired, the coupling-sleeves are provided with single screw-threads only, running in the same direction, from end to end of each sleeve, and the head *d* of the portion $b'$ of each spoke is made round, so that it can be turned in its seat in the rim. This permits the outer portion, $b'$, of the spoke to be screwed into the coupling-sleeves, as spokes are usually screwed into the hub; but this construction is not so desirable as the construction first described, in which both parts $b\ b'$ of the spoke are held against turning, because the outer portion of the spoke in the second construction is liable to work loose. By interlocking or crossing the spokes or sleeves, as described, the wheel is rendered more rigid than heretofore, and the wire of the spokes need not be enlarged where it passes through the hub. The screw-threaded ends of the wire may be enlarged, if desired, and in this case the openings $a'$ in the hub must be made larger to permit the wire to pass through. These enlarged openings are then filled by enlarging the head at the hub end of the spoke. The part of the wire which is seated in the rim of the wheel is preferably enlarged, to prevent its wearing off, and this enlargement *d* is made oblong, to prevent the spoke from turning in the rim. The washers $d'$ are provided with oblong holes, which receive these enlarged portions *d* of the spokes, and the washers themselves are held against turning by fitting in the curved inner part of the rim. When solid rims are used, which do not require washers, the rim is made with oblong or oval holes, in which the enlarged portions *d* of the spokes are seated, and which prevent the spokes from turning. As the holes in the washers are elongated only in the longitudinal direction of these parts, they do not weaken these parts more than a round hole having the smallest diameter of the elongated opening.

The arrangement of the spokes in pairs closely together at the hub is equally desirable for tangent spokes, which are adjusted by nuts at the rim, and interlocking coupling-sleeves may be used with spokes which are not arranged in pairs.

F represents a braid composed of several strands of cord, cotton, hemp, or other fibrous material, embedded in the rubber tire by placing the braid in the mold and vulcanizing the rubber around it and through the open spaces between the several strands. The braid permits the tire to be stretched sufficiently to enable it to be applied to the rim, and as the rubber fills the openings between the strands of the braid these intermediate portions of the rubber are pressed in, stretching the braid, thereby limiting the distance to which the tire can be stretched, which tends to retain the tire in its seat with greater security. The braid increases the tensile strength of the tire materially, and prevents its being cut or torn into, and affords a better surface to receive the cement by which the tire is secured to the rim. The inner bends of the braid rest against the rim.

The number of strands in the braid is immaterial, and may be increased or reduced so long as there are several strands which are so interlaced with each other that they will permit the tire to be stretched sufficiently to apply it to the rim and resist stretching sufficiently to hold the tire on the rim after it is applied.

G represents one of the bearings in which the wheel is journaled, and H represents one of the fork-arms.

g represents the lug formed on the upper side of the bearing, and engaging in the recess at the lower end of the fork, to which latter it is secured by a horizontal bolt, h. The lug g is arranged out of center on the bearing, so that when the bearing is attached to the fork-arm the latter does not stand centrally over the bearing, but on one side of the central line, as represented in Fig. 1. By reversing the arrangement of the bearing with reference to the fork-arm the latter can be arranged forwardly or backwardly of the central line of the bearing, thereby enabling the fork-arm to be placed in a position of greater security, or in a position in which greater speed is attained by a better application of the power to the treadles, as may be desired.

It is obvious that the amount or degree of adjustment can be increased or reduced by providing different bearings having the lugs at a greater or less distance from the central line of the bearing-box, and that an intermediate position may be had by employing boxes with the lug arranged centrally, as usual. This enables the dealer to adapt the machine quickly to the requirements of any particular customer, by simply inserting boxes having the lugs arranged in the desired manner, and it enables beginners to adjust their machines to a safe rake at first, and to change them afterward to a more desirable position for speed, by simply adjusting the bearing-box.

I claim as my invention—

1. The combination, with the hub-flange, of tangent spokes arranged in pairs, one on the inside and one on the outside of the hub-flange, and secured in openings formed in the hub-flange closely together, with intervening spaces between the several pairs of openings in the hub-flange, substantially as set forth.

2. The combination, with two intersecting spokes, each composed of two parts, of coupling-sleeves, whereby the two parts of each spoke are secured together, said coupling-sleeves being interlocked with each other, substantially as set forth.

3. The combination, with the hub and rim, of intersecting spokes B and coupling-sleeves C, provided with flat or recessed interlocking parts c, substantially as set forth.

4. A rubber tire for wheels provided with several interlaced strands or braids of cord molded in the tire, substantially as set forth.

5. A rubber tire for wheels provided with several strands of cord molded in the tire and interlaced to form openings between the several strands, which openings are filled with the substance of the tire, and whereby the stretching of the tire is limited and its tensile strength and elasticity are increased, substantially as set forth.

6. The combination, with the fork or frame, of the bearing-box provided with a lug or attachment which is arranged out of center with reference to the bearing-box, and whereby the relative position of the fork and wheel can be changed by reversing the arrangement of the bearing-box with reference to the fork or frame, substantially as set forth.

7. The combination, with the fork H, of the bearing-box G, provided with a lug, g, arranged out of center on the bearing-box, and bolt h, whereby the bearing-box is attached to the fork, substantially as set forth.

Witness my hand this 10th day of December, 1885.

EMMIT G. LATTA.

Witnesses:
S. M. NORTON,
HERMAN RICE.